July 26, 1949.                J. COHEN ET AL                2,477,440
           MACHINE TO IMPRESS DECORATIVE STRIPS ON ARTICLES
Filed May 16, 1947                                  5 Sheets-Sheet 1
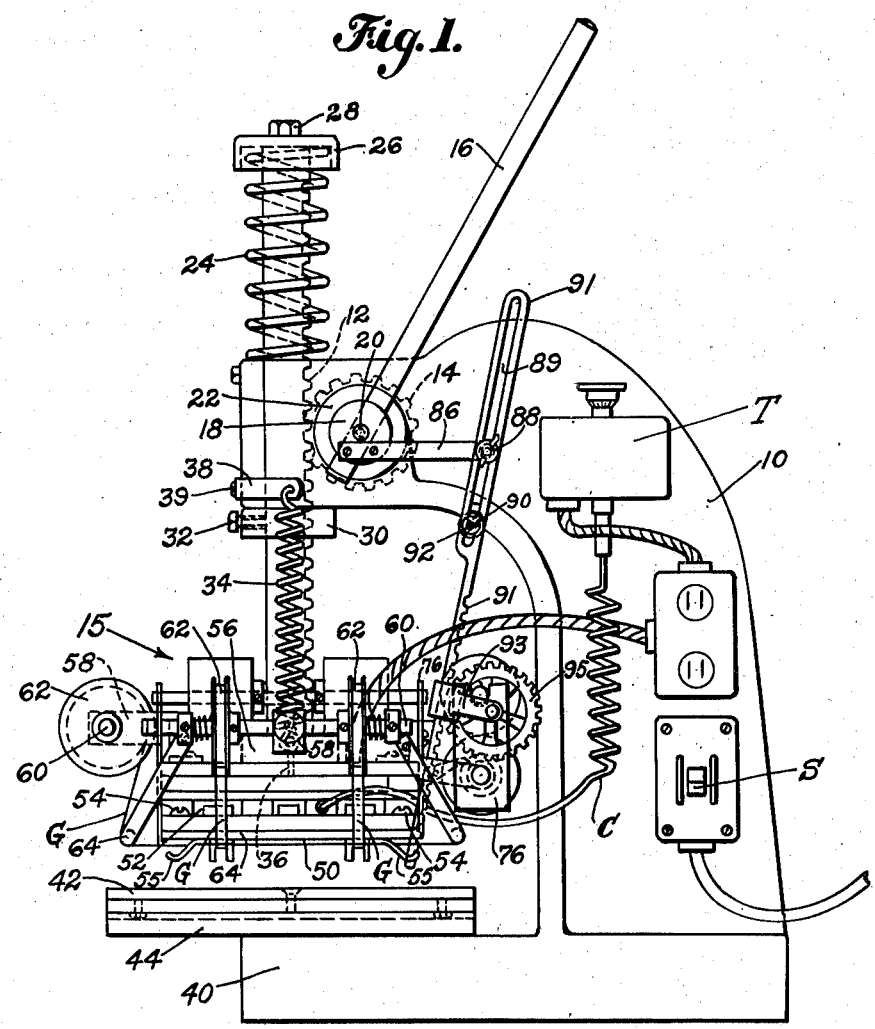
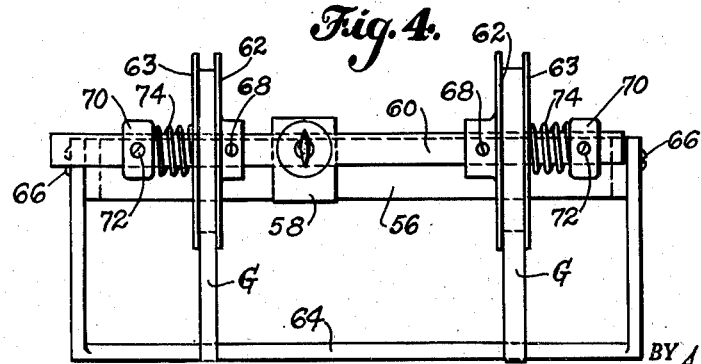

July 26, 1949.  J. COHEN ET AL  2,477,440
MACHINE TO IMPRESS DECORATIVE STRIPS ON ARTICLES
Filed May 16, 1947  5 Sheets-Sheet 2
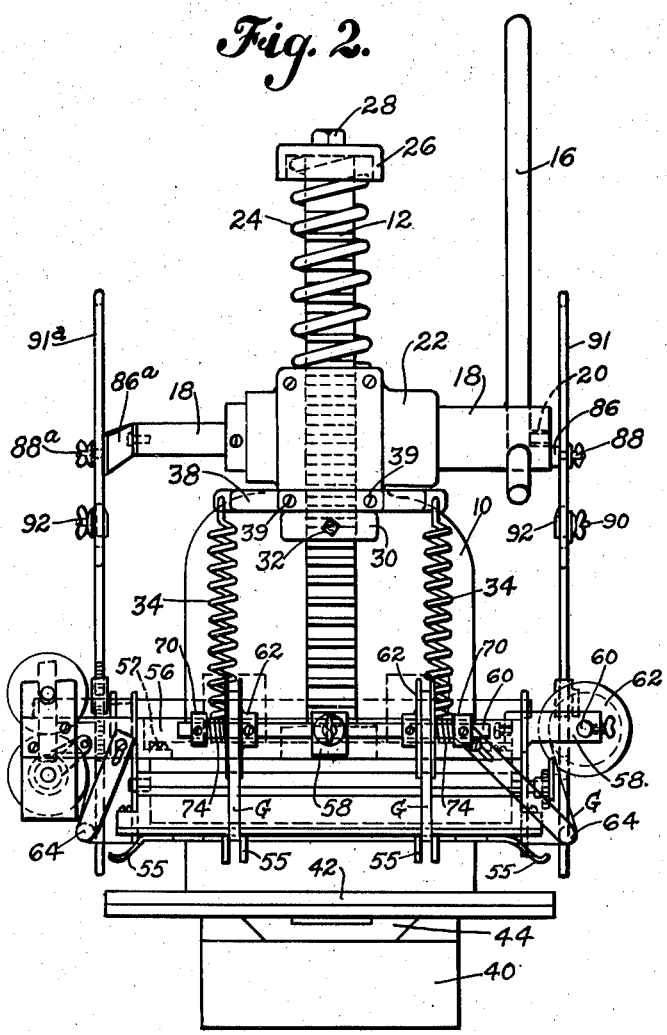
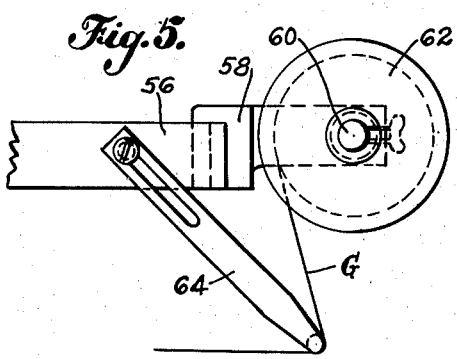
INVENTORS
Jacob Cohen
Samuel Blake
BY Harold E. Cole
Attorney July 26, 1949.　　　　J. COHEN ET AL　　　　2,477,440
MACHINE TO IMPRESS DECORATIVE STRIPS ON ARTICLES
Filed May 16, 1947　　　　　　　　　　5 Sheets-Sheet 3

INVENTORS
Jacob Cohen
BY Samuel Blake
Harold E. Cole
Attorney

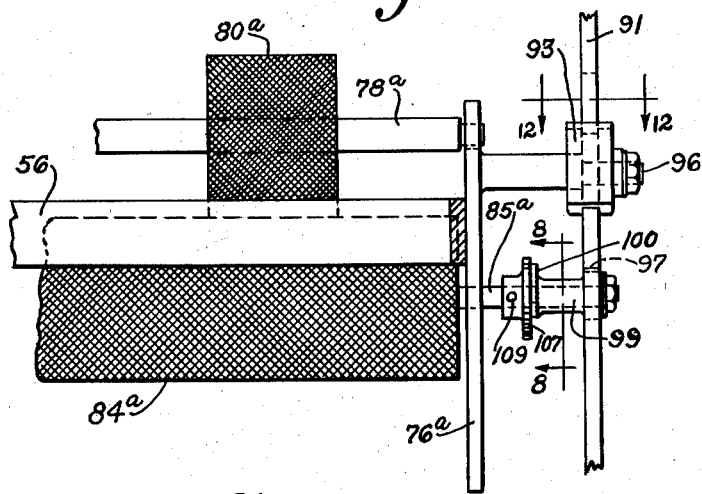
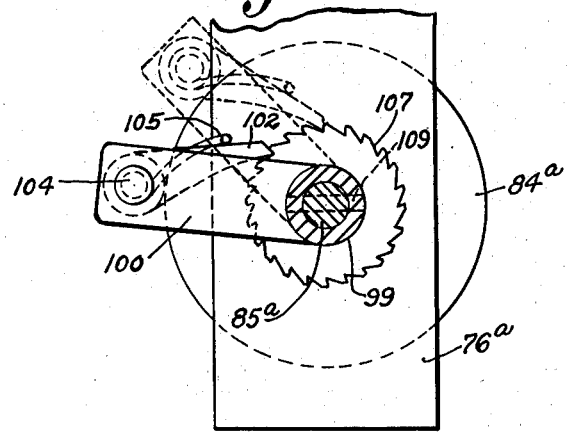
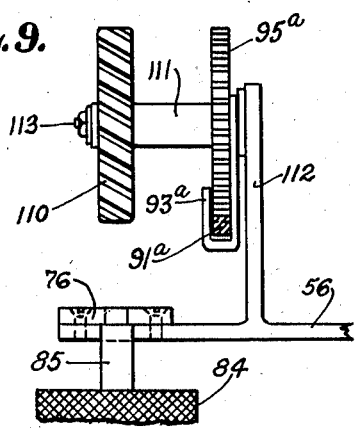

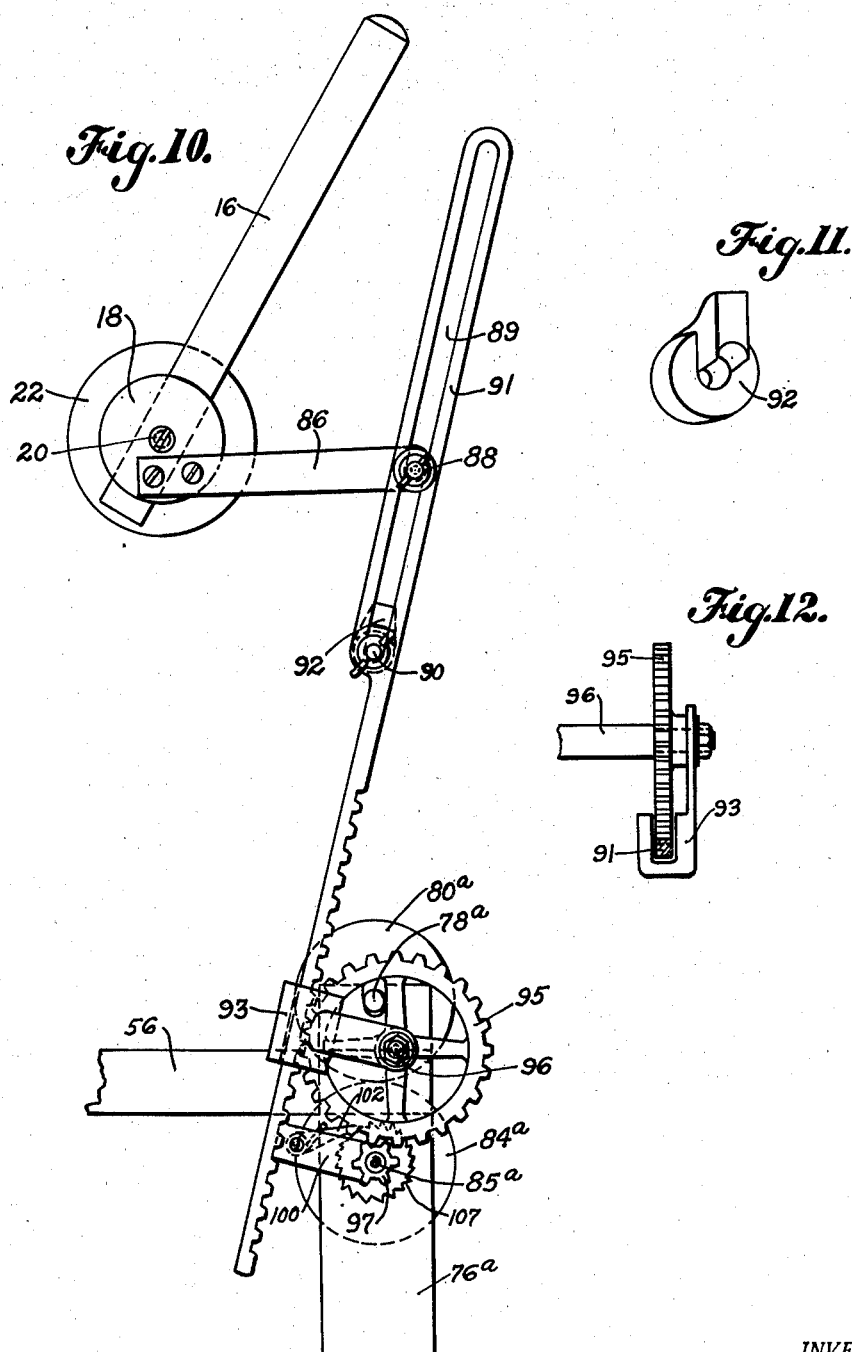

Patented July 26, 1949

2,477,440

UNITED STATES PATENT OFFICE 2,477,440

MACHINE TO IMPRESS DECORATIVE STRIPS ON ARTICLES

Jacob Cohen and Samuel Blake, Boston, Mass.

Application May 16, 1947, Serial No. 748,602

14 Claims. (Cl. 41—7)

This invention relates to a machine to impress strips of decorative material upon articles. It embodies an improvement upon the machine disclosed in our pending patent application, Serial No. 692,399, filing date August 22, 1946.

The principal object of our invention is to provide a machine that will automatically feed strips of decorative material, such as gold leaf, which strips extend at a right angle to each other, across a book cover or other article to be impressed with said decorative material.

A further object is to provide such a machine that is compact and can be manufactured at a moderate cost.

Another object is to provide such a machine that is simple, but reliable in operation.

The foregoing and other objects which will appear as the nature of the invention is better understood, may be accomplished by a construction, combination and arrangement of parts such as is disclosed by the drawings and specification. The nature of the invention is such as to render it susceptible to various changes and modifications, and, therefore, we are not to be limited to said disclosures; but are entitled to all such changes therefrom as fall within the scope of our claims.

In the drawings:

Figure 1 is a right side elevational view of our machine in normal or non-operating position.

Figure 2 is a front elevational view thereof.

Figure 4 is an enlarged, elevational view of the feed roll mechanism which is located at the front and also at one side of our machine.

Figure 5 is an enlarged side elevational view of feed roll mechanism shown in Figure 4.

Figure 7 is an enlarged, front elevational view broken away, of the take-up rolls and mechanism at the rear of our machine.

Figure 8 is an enlarged sectional view taken on the line 8—8 of Figure 7.

Figure 9 is an enlarged, top plan view of part of the mechanism at the left side of our machine at the rear to operate the take-up rolls at said left side.

Figure 10 is an enlarged, side elevational view of the take-up operating mechanism at the right side of our machine.

Figure 11 is a perspective view of the adjustable stop member shown as part of Figure 10.

Figure 12 is a sectional view taken on the line 12—12 of Figure 7.

Figure 3:
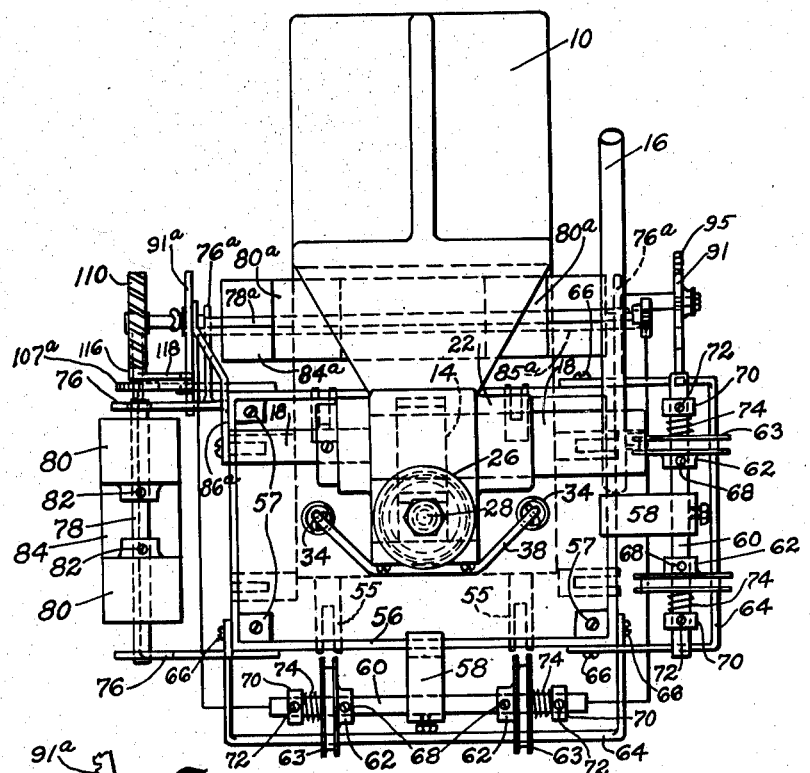
Figure 3 is a top plan view thereof.
Figure 6:
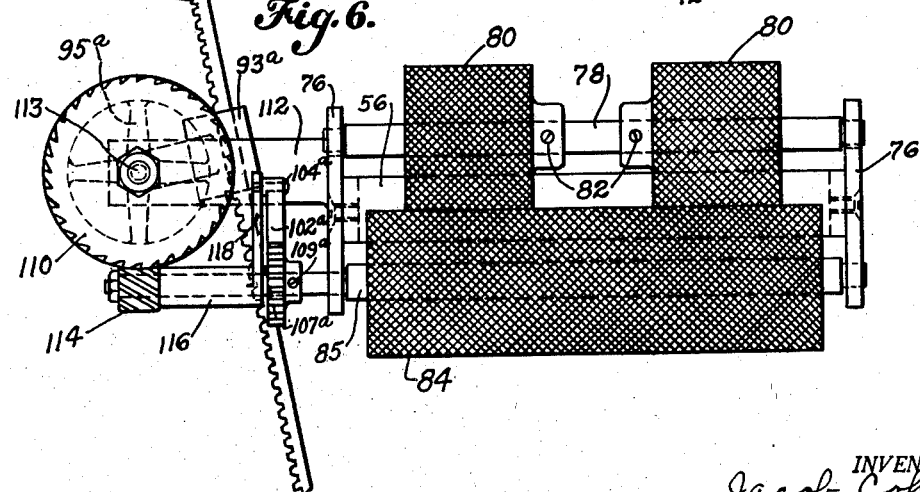
Figure 6 is an enlarged, side elevational view of the take-up rolls and mechanism at the left side of our machine.

As illustrated, our machine has a main supporting member 10 on which is assembled a vertical toothed rack 12 and a pinion 14, in mesh with said rack 12, which pinion 14 operates a press unit or assembly 15, usually including a die, upwardly and downwardly when actuated by a hand lever 16, said press unit 15 being attached to said rack 12. Said lever 16 is attached to a shaft 18 by a set screw 20, said shaft 18 being fixed to said pinion 14, and in turn it is rotatably mounted in a bearing portion 22 formed in said supporting member 10.

A coil spring 24 normally under compression extends between a portion of said support 10 and a collar 26 attached to said rack 12 by a screw 28. This spring helps to raise the rack 12 and press member 15 upwardly. An adjustable collar 30, fastened to said rack 12, by a screw 32, regulates the distance the press member 15 may be raised and lowered. Two coil springs 34 are fastened to said press member 15 by eyelets 36 and to said supporting member 10 by a spring stand 38 which is fastened by screws 39 to said support 10. Said support 10 has a table or base 40 having a plate 42 thereon on which the article to be decorated rests. Said plate 42 is adjustable forwardly and rearwardly by means of a dovetail slide portion 44.

Our machine is provided with a well known heating apparatus including a starting switch S, a thermostat T and a copper fluid coil and tube C leading to a heating unit 52.

Said press member 15 has a presser plate 50 fastened to said heating unit 52 by screws 54. Guide clips 55, which guide said decorative material G, are attached to said plate 50. The details of said clips 55 are explained in said patent application, Serial No. 692,399. A frame 56 extends around said press unit 15, being bolted as at 57 to said press unit. Said frame 56 has two bearings 58 mounted thereon, one on the front and one on the right side in each of which is mounted a fixed shaft 60. Two supply rolls 62, which serve as let-off rolls, and which carry the supply of strips of gold leaf or other decorative material G, are mounted on each shaft 60. A disc 63 bears against each roll of said material G. Guide rods 64, fastened by screws 66 to said press member frame 56 help to guide said strips of decorative material G. Said supply rolls 62 are held to said shafts 60 by screws 68, said rolls being adjustably located on said shafts 60 between collars 70 held to said shafts by screws 72. Coil springs 74 are compressibly mounted on said shafts 60 between said disc 63, and said collars 70, thus keeping said roll of material G from too freely unwinding. The number of supply rolls 62 mounted on said shafts 60 may be varied, depending on how many strips of decorative material G it is desired to impress upon the article to be decorated with gold leaf or the like.

Brackets 76 are fastened on the left side of said frame 56, in which brackets a shaft 78 is rotatably and loosely mounted. Two knurled take-up rolls 80 are adjustably mounted on said shaft 78 by screws 82. Another shaft 85 is rotatably mounted in said brackets 76, on which shaft is carried a knurled, take-up roll 84 which is lower than and bears against said take-up rolls 80 to thus draw away what is left of that portion or portions of the strip or strips of decorative material G that was impressed upon the article and present fresh material G to be impressed.

At the rear of our machine on both sides of frame 56 is located similar take-up mechanism embodying brackets 76a rotatably supporting a shaft 78a on which take-up rolls 80a are mounted. Another take-up shaft 85a is rotatably mounted in said brackets 76a on which take-up roll 84a is rotatably mounted and bears against said rolls 80a.

At the right of and attached to said pinion shaft 18 is an arm 86 on the outer end of which is a stud 88 that is slideably mounted in an elongated slot 89 provided in the upper portion of a toothed rack 91. An adjustable stop 92 is adjustably mounted in said slot 89 and held by a bolt 90. This stop limits the travel of said rack 91 thus limiting rotation of said take-up rolls. The lower and toothed portion of the rack 91 slidably extends through an opening in a guide arm 93 and its teeth mesh with a gear 95 that is mounted on a stud 96. Said gear 95 engages a pinion 97 that is mounted on said take-up shaft 85a. This pinion 97 has a hub portion 99 and a connecting arm 100 extends therefrom on which arm is attached a pawl 102 by a stud 104 and a spring 105. Said pawl 102 engages the teeth of a ratchet 107 which is fastened to said take-up shaft 85a by a pin 109. When said gear 95 is rotated clockwise by the upward movement of said rack 90 in response to the down-pull of said lever 16, said pinion 97 is rotated counterclockwise, hence said ratchet 107 does not rotate as said arm 100 carries said pawl 102 downwardly as indicated in Figure 8 of the drawings. But in the opposite movement, as said lever 16 is moved upwardly, said pinion 97 is rotated clockwise causing the arm 100 to carry said pawl 102 upwardly and thereby engage the teeth of the ratchet 107 and force it to revolve. This rotates said shaft 85a and thus the take-up rolls 80a and 84a which draw away the used portion of said decorative material G.

On the left side of said shaft 18 there is a similar actuating mechanism for the take-up rolls 80 and 84. An arm 86a is fastened to said pinion shaft 18 and is connected, in the manner previously explained, to another toothed rack 91a similar to 91. A gear 95a is connected to a helical gear 110 by a rotating hub 111 which is mounted to a supporting extension arm 112 forming part of said frame 56. A stud 113 extends through said hub 111 and is fixed to said arm 112. Said gears 95a and 110 and hub 111 are rotatably mounted on said stud 113. Said rack 91a slidably extends through an opening in a guide arm 93a and meshes with and rotates said gear 95a thus rotating the helical gear 110, which is in engagement with a helical pinion 114 rotatably mounted on said shaft 85. Said helical gear 110 and pinion 114 effect a right-angled drive connection. Said pinion 114 has a hub portion 116 from which an arm 118 extends on which is pivotally mounted a pawl 102a by a stud 104a. Said pawl 102a engages a ratchet 107a, which is fastened to said shaft 85 by a pin 109a, and upon the upward or return movement of said lever 16 said shaft 85 is rotated thus rotating said roll 84 while in contact with said rolls 80 to draw away the used portion of said decorative material G.

In operation, said lever 16 is moved downwardly which rotates said shaft 18 and moves said arm 86 in rack 91 so that before said movement is completed said rack 91 is moved upwardly to thereby rotate said gear 95 which results as explained, in a neutral movement of said arm 100 and pawl 102. Said gear 95a is simultaneously rotated in the same way gear 95 is, which results in a neutral movement of said arm 118 and pawl 102a.

Upon completion of the downward movement of said lever 16, which moves said press unit 15 to operating position to thereby impress the gold leaf G upon the article to be decorated, said lever 16 is moved upwardly. This rotates said gears 95 and 95a reversely through upward movement of said racks 91 and 91a and they rotate in a direction opposite to that caused by the downward movement of said lever 16. This causes said pawls 102 and 102a to take effect upon and rotate said ratchets 107 and 107a, as explained, which in turn rotate said shafts 85 and 85a on which said take-up rolls 84 and 84a are fixedly mounted.

This draws the used portions of said decorative strips G out of the way and in turn simultaneously unrolls fresh strips G on said rolls 62 so that there is automatically presented for the next stamping new strips of decorative material G. These strips G unwinding from the front rolls cross the strips from the rolls at the side at a right angle, being in criss-cross relation.

What we claim is:

1. A machine of the class described comprising supporting means, instrumentalities to supply strips of decorative material to an article to be decorated supported by said means and embodying supply means at the front of and another supply means at a side of said machine, instrumentalities to take up portions of said strips after they have been applied supported by said supporting means embodying take-up members at the rear of and take-up members at the other side of said machine adapted to receive strips from said supply members at the said front and side respectively, movable agencies adapted upon actuation to apply said strips to a said article and return to normal position, movable connecting means between said agencies and said take-up instrumentalities adapted to be actuated by said agencies to thereby actuate said take-up members and withdraw portions of said strips remaining after they have been applied to said article.

2. A machine of the class described comprising supporting means, instrumentalities to supply strips of decorative material to an article to be decorated supported by said means and embodying supply means at the front of and another supply means at a side of said machine, instrumentalities to take up portions of said strips after they have been applied supported by said supporting means embodying take-up members, at the rear of and take-up members at the other side of said machine adapted to receive strips from said supply members at the said front and side respectively, movable agencies adapted upon actuation to apply said strips to a said article and return to normal position, movable connecting means between said agencies and said take-up instrumentalities adapted to be actuated by said agencies upon their returning to normal position to thereby actuate said take-up members and withdrawn portions of said strips remaining after they have been applied to said article.

3. A machine of the class described comprising supporting means, instrumentalities to supply strips of decorative material to an article to be decorated supported by said means and embodying a supply roll member at the front of and another supply roll member at a side of said machine instrumentalities to take up portions of said strips after they have been applied supported by said supporting means embodying take-up rolls at the rear of and take-up rolls at the other side of said machine adapted to receive strips from said supply rolls at the said front and side respectively, movable agencies adapted upon actuation to apply said strips to a said article and return to normal position, movable connecting means between said agencies and said take-up instrumentalities embodying movable members operatively connected to said take-up rolls adapted to be actuated by said agencies upon their returning to normal position to thereby actuate said take-up rolls and withdraw portions of said strips remaining after they have been applied to said article.

4. A machine of the class described comprising supporting means, instrumentalities to supply strips of decorative material to an article to be decorated supported by said means and embodying a supply roll at the front of and another supply roll at a side of said machine, instrumentalities to take up portions of said strips after they have been applied supported by said supporting means embodying take-up rolls at the rear of and take-up rolls at the other side of said machine adapted to receive strips from said supply rolls at the said front and side respectively, movable agencies adapted upon actuation to apply said strips to a said article and return to normal position embodying two gears in mesh and at substantially a right angle to each other, movable connecting means between said agencies and said take-up instrumentalities adapted to be actuated by said agencies upon their returning to normal position to thereby actuate said take-up rolls and withdraw portions of said strips remaining after they have been applied to said article.

5. A machine of the class described comprising supporting means, instrumentalities to supply strips of decorative material to an article to be decorated supported by said means and embodying supply means at the front of and another supply means at a side of said machine, instrumentalities to take up portions of said strips after they have been applied supported by said supporting means embodying take-up rolls at the rear of and take-up rolls at the other side of said machine adapted to receive strips from said supply rolls at the said front and side respectively, movable agencies adapted upon actuation to apply said strips to a said article and return to normal position, and take-up instrumentalities embodying two movable toothed racks extending upwardly and spaced apart, gears in mesh with the teeth of said racks, means connecting said agencies to said racks embodying members adjustably mounted to said rack in a position whereby they limit the movement of said racks and thereby limit the rotation of said gears, means operatively connecting said gears to said take-up rolls whereby said take-up rolls withdraw portions of said strips remaining after they have been applied to said article.

6. A machine of the class described comprising supporting means, instrumentalities to supply strips of decorative material to an article to be decorated supported by said means and embodying supply means at the front of and another supply means at a side of said machine, instrumentalities to take up portions of said strips after they have been applied supported by said supporting means embodying take-up rolls at the rear of and take-up rolls at the other side of said machine adapted to receive strips from said supply rolls at the said front and side respectively, movable agencies adapted upon actuation to apply said strips to a said article and return to normal position, said take-up instrumentalities embodying two movable toothed racks extending upwardly and spaced apart and having elongated slots in their upper portions, gears in mesh with the teeth of said racks, means connecting said agencies to said racks embodying stop members adjustably mounted to said rack in a postion whereby they limit the movement of said racks and thereby limit the rotation of said gears, means operatively connecting said gears to said take-up rolls whereby said take-up rolls withdraw portions of said strips remaining after they have been applied to said article.

7. A machine of the class described comprising supporting means, instrumentalities to supply strips of decorative material to an article to be decorated supported by said means and embodying a supply roll at the front of and another supply roll at the rear of said machine, instrumentalities to take up portions of said strips after they have been applied supported by said means embodying a rotatable shaft at the rear and another rotatable shaft at the other side of said machine and embodying take-up rolls on said two shafts adapted to receive strips from said supply rolls at the said front and side respectively, movable agencies adapted upon actuation to apply said strips to a said article, movable connecting means between said agencies and said take-up instrumentalities adapted to be actuated by said agencies embodying two gears in mesh and positioned at substantially a right angle to each other whereby motion is transmitted at a right angle, and means connecting one of said gears to one of said take-up rotatable shafts.

8. A machine of the class described comprising supporting means, instrumentalities to supply strips of decorative material to an article to be decorated supported by said means and embodying a supply roll at the front of and another supply roll at the rear of said machine, instrumentalities to take up portions of said strips after they have been applied supported by said means embodying a rotatable shaft at the rear and another rotatable shaft at the other side of said machine and embodying take-up rolls on said two shafts adapted to receive strips from said supply rolls at the said front and side respectively, movable agencies adapted upon actuation to apply said strips to a said article and return to normal position, movable connecting means between said agencies and said take-up instrumentalities adapted to be actuated by said agencies upon return to normal position embodying two gears in mesh and positioned at substantially a right angle to each other whereby motion is transmitted at a right angle and means connecting one of said gears to one of said take-up rotatable shafts.

9. A machine of the class described comprising supporting means, instrumentalities to supply strips of decorative material to an article to be decorated supported by said means and embodying supply members so positioned that they may supply said strips at right angles to each other when in position to be applied, movable agencies adapted upon actuation to apply said strips to a said article, instrumentalities to take up portions of said strips after they have been applied, movable connecting means between said agencies and said take-up instrumentalities adapted to be actuated by said agencies upon return movement to normal position to thereby actuate said take-up instrumentalities and withdraw portions of said strips remaining after they have been applied to said article, said take-up instrumentalities embodying a rotatable take-up shaft, a rotatable gear actuated by said agencies, a helical gear, rotatable with said rotatable gear, a helical pinion in mesh with said helical gear and effecting a right-angled turn of the motion between it and said helical gear, means connected to and movable with said pinion, a ratchet in engagement with said latter means, said ratchet being fixed to said take-up shaft, said latter means being so positioned relative to said ratchet that when said latter means moves in one direction it does not actuate said ratchet, but movement in the opposite direction rotates said ratchet and thereby rotates said take-up shaft.

10. A machine of the class described comprising supporting means, instrumentalities to supply strips of decorative material to an article to be decorated supported by said means and embodying supply members so positioned that they may supply said strips at right angles to each other when in position to be applied, movable agencies adapted upon actuation to apply said strips to a said article, instrumentalities to take up portions of said strips after they have been applied, movable connecting means between said agencies and said take-up instrumentalities adapted to be actuated by said agencies upon return movement to normal position to thereby actuate said take-up instrumentalities and withdraw portions of said strips remaining after they have been applied to said article, said take-up instrumentalities embodying a rotatable take-up shaft, a rotatable gear actuated by said agencies, a helical gear, means fixedly connecting said rotatable gear and helical gear, a helical pinion in mesh with and so positioned relative to said helical gear to effect a right-angled turn of the motion between it and said helical gear, an arm connected to and movable with said pinion, a pawl mounted on said arm, a ratchet in engagement with said pawl, said ratchet being fixed to said take-up shaft, said pawl being so positioned relative to said ratchet that when said arm moves in one direction said pawl does not actuate said ratchet, but movement in the opposite direction rotates said ratchet and thereby rotates said take-up shaft.

11. A machine of the class described comprising supporting means, instrumentalities to supply strips of decorative material to an article to be decorated supported by said means and embodying supply members so positioned that they may supply said strips at right angles to each other when in position to be applied, movable agencies adapted upon actuation to apply said strips to a said article embodying a toothed rack, instrumentalities to take up portions of said strips after they have been applied, movable connecting means between said agencies and said take-up instrumentalities adapted to be actuated by said agencies upon return movement to normal position to thereby actuate said take-up instrumentalities and withdraw portions of said strips remaining after they have been applied to said article, said take-up instrumentalities embodying a rotatable take-up shaft, a rotatable gear in mesh with and actuated by said toothed rack, a helical gear, means fixedly connecting said rotatable gear and helical gear, a helical pinion in mesh with and so positioned relative to said helical gear to effect a right-angled turn of the motion between it and said helical gear, an arm connected to and movable with said pinion, a pawl mounted on said arm, a ratchet in engagement with said pawl, said ratchet being fixed to said take-up shaft, said pawl being so positioned relative to said ratchet that when said arm moves in one direction said pawl does not actuate said ratchet, but movement in the opposite direction rotates said ratchet and thereby rotates said take-up shaft.

12. A machine of the class described comprising supporting means, press unit means movably supported by said supporting means, actuating means embodying a movable member connected to and adapted upon actuation to move said press unit means, a shaft at the front and a shaft at a side of said machine supported by said supporting means, supply rolls on said shafts adapted to receive and permit rolls of decorative material to be unwound therefrom, other shafts rotatably supported by said supporting means at said front and side of said machine, take-up rolls fixedly mounted on said latter shafts, take-up shafts at said front and side of said machine rotatably mounted in said brackets, other take-up rolls mounted on said take-up shafts so positioned that the rolls on each pair of said shafts are in contact with each other, two toothed racks movably supported by said supporting means, means connecting said movable member and toothed racks whereby said lever actuates said racks, gears in mesh with the teeth of said racks, a pinion in engagement with one said rack-engaging gear, said pinion being rotatably mounted on one said take-up shaft, an arm connected to said pinion, a pawl carried by said arm, a ratchet fixedly mounted on said take-up shaft, said pawl being in contact with said ratchet and so positioned relatively thereto that when said latter arm moves in one direction said pawl does not actuate said ratchet but movement in the opposite direction does rotate said ratchet and thereby rotates said take-up shaft it is mounted on, a helical gear, means supported by said frame connecting said helical gear to another said rack-engaging gear, a helical pinion at substantially a right-angle to and in mesh with said helical gear, another pawl, another ratchet, an arm connected to said pinion and carrying said pawl, said ratchet being fixed to another said take-up shaft, said latter pawl being in contact with said latter ratchet and so positioned relative thereto that when said latter arm moves in one direction said pawl does not actuate said other ratchet but movement in the opposite direction does rotate said other ratchet and thereby rotates said take-up shaft it is mounted on.

13. A machine of the class described comprising supporting means, press unit means movably supported by said supporting means, actuating means embodying a movable lever connected to and adapted upon actuation to move said press unit means, a frame around and attached to said press unit means, a shaft at the front and a shaft at a side of said machine supported by said frame, supply rolls on said shafts adapted to receive and permit rolls of decorative material to be unwound therefrom, said frame embodying brackets at the front and at a side of said machine, other shafts rotatably mounted in said brackets at said front and side of machine, take-up rolls fixedly mounted on said latter shafts, take-up shafts at said front and side of said machine rotatably mounted in said brackets, other take-up rolls mounted on said take-up shafts so positioned that the rolls on each pair of said shafts are in contact with each other, two toothed racks movably supported by said supporting means, means connecting said lever and toothed racks whereby said lever actuates said racks, gears in mesh with the teeth of said racks, a pinion in engagement with one said rack-engaging gear, said pinion being rotatably mounted on one said take-up shaft, an arm connected to said pinion, a pawl carried by said arm, a ratchet fixedly mounted on said take-up shaft, said pawl being in contact with said ratchet and so positioned relatively thereto that when said latter arm moves in one direction said pawl does not actuate said ratchet but movement in the opposite direction does rotate said ratchet and thereby rotates said take-up shaft it is mounted on, a helical gear, means supported by said frame connecting said helical gear to another said rack-engaging gear, a helical pinion at substantially a right angle to and in mesh with said helical gear, another pawl, another ratchet, an arm connected to said pinion and carrying said pawl, said ratchet being fixed to another said take-up shaft, said latter pawl being in contact with said latter ratchet and so positioned relative thereto that when said latter arm moves in one direction said pawl does not actuate said other ratchet but movement in the opposite direction does rotate said other ratchet and thereby rotates said take-up shaft it is mounted on.

14. A machine of the class described comprising supporting means, press unit means movably supported by said supporting means, actuating means embodying a movable member connected to and adapted upon actuation to move said press unit means, a frame around and attached to said press unit means, a shaft at the front and a shaft at a side of said machine, supply rolls on said shafts adapted to receive and permit rolls of decorative material to be unwound therefrom, said frame embodying brackets at the front and at a side of said machine, other shafts rotatably mounted in said brackets at said front and side of said machine, take-up rolls fixedly mounted on said latter shafts, take-up shafts at said front and side of said machine rotatably mounted in said brackets, other take-up rolls mounted on said take-up shafts so positioned that the rolls on each pair of said shafts are in contact with each other, two toothed racks having slots in their upper portions and teeth at their lower portions, two arms connected to said lever and slidable in said rack slots whereby said rack is actuated, gears in mesh with the teeth of said racks, a pinion in engagement with one said rack-engaging gear, said pinion being rotatably mounted on one said take-up shaft, an arm connected to said pinion, a pawl carried by said arm, a ratchet fixedly mounted on said take-up shaft, said pawl being in contact with said ratchet and so positioned relative thereto that when said latter arm moves in one direction said pawl does not actuate said ratchet but movement in the opposite direction does rotate said ratchet and thereby rotates said take-up shaft it is mounted on, a helical gear, means supported by said frame connecting said helical gear to another said rack-engaging gear, a helical pinion at substantially a right angle to and in mesh with said helical gear, another pawl, another ratchet, an arm connected to said pinion and carrying said pawl, said ratchet being fixed to another said take-up shaft, said latter pawl being in contact with said latter ratchet and so positioned relative thereto that when said latter arm moves in one direction said pawl does not actuate said other ratchet but movement in the opposite direction does rotate said other ratchet and thereby rotates said take-up shaft it is mounted on.

JACOB COHEN.
SAMUEL BLAKE.

REFERENCES CITED

The following references are of record in the file of this patent:

UNITED STATES PATENTS

| Number | Name | Date |
| --- | --- | --- |
| 1,162,448 | Brooke | Nov. 30, 1915 |
| 1,242,454 | Littlefield | Oct. 9, 1917 |
| 2,428,879 | Kahn | Oct. 14, 1947 |